United States Patent
Kikuchi

(10) Patent No.: US 12,292,285 B2
(45) Date of Patent: May 6, 2025

(54) SURVEY ASSISTANCE SYSTEM AND SURVEY ASSISTANCE METHOD

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 248 days.

(21) Appl. No.: 17/991,730

(22) Filed: Nov. 21, 2022

(65) Prior Publication Data

US 2023/0160694 A1  May 25, 2023

(30) Foreign Application Priority Data

Nov. 24, 2021 (JP) .................................. 2021-190479

(51) Int. Cl.
*G01C 15/00* (2006.01)
*G06T 19/00* (2011.01)

(52) U.S. Cl.
CPC .......... *G01C 15/002* (2013.01); *G06T 19/006* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2017/0082748 A1* | 3/2017 | Nishita | ............... | G02B 26/124 |
| 2018/0356222 A1* | 12/2018 | Metzler | ............... | G06T 19/006 |
| 2019/0347860 A1* | 11/2019 | Steiner | ................... | G06V 20/20 |
| 2020/0386898 A1* | 12/2020 | Moe | ....................... | G01C 15/08 |
| 2021/0142576 A1 | 5/2021 | Kikuchi | | |
| 2022/0283327 A1* | 9/2022 | Mueller | ................ | G01C 11/06 |

FOREIGN PATENT DOCUMENTS

JP  2021077127 A  5/2021

\* cited by examiner

*Primary Examiner* — Ryan McCulley
(74) *Attorney, Agent, or Firm* — Studebaker Brackett PLLC

(57) ABSTRACT

Provided is a survey assistance system including a measuring instrument; an eyewear display device including a display; and at least one processor configured to synchronize a coordinate space of the eyewear display device, a coordinate space of the measuring instrument, and a coordinate space of an absolute coordinate system and displays an image in the absolute coordinate system created by the processor on the display with superimposing the image on a site landscape. The processor is configured to read out survey process data, create a work assistance image based on the survey process data, and enable observation of the work assistance image including the instrument installation points and images of the surveying instrument to be used showing installed states at the instrument installation points by superimposing the work assistance image on the site landscape.

12 Claims, 18 Drawing Sheets

| Measurement order | Instrument installation point coordinates | Measuring object | Instrument (type) to be used | Accessory |
|---|---|---|---|---|
| 1 | Instrument installation point P1<br>XX° XX' XX",<br>XX° XX' XX" | Measurement point Q1<br>XX° XX' XX",<br>XX° XX' XX" | Total station<br><br>TS01 XXXXX | Tripod SD01 |
| 2 | Instrument installation point P2<br>XX° XX' XX",<br>XX° XX' XX" | Area A | Scanner S07 | Tripod SD05 |
| 3 | Instrument installation point P3<br>XX° XX' XX",<br>XX° XX' XX" | Area B | Scanner S07 | Tripod SD05 |
| 4 | Instrument installation point P4<br>XX° XX' XX",<br>XX° XX' XX" | Area C | Scanner S07 | Tripod SD05 |

FIG. 7A

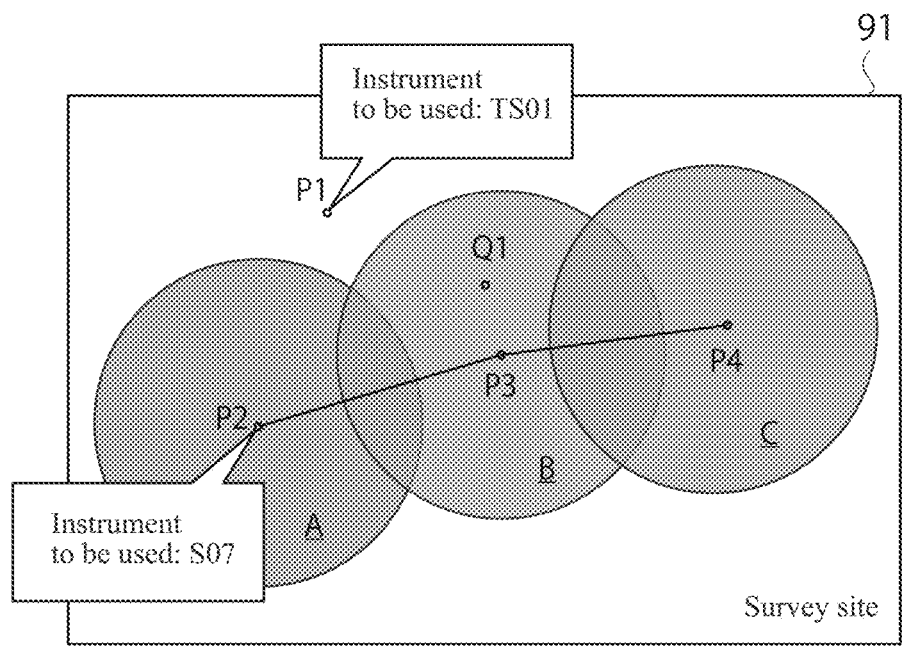

FIG. 7B

| Type | Model number | Instrument image | Accessory | Accessory image |
|---|---|---|---|---|
| TS01 | XYX1 | 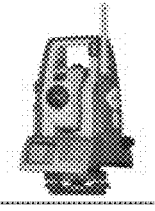 | Tripod TS1 |  |
| TS04 | YYX3 | 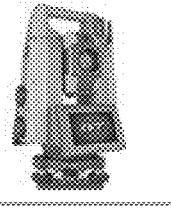 | Tripod TS3 |  |
| S07 | XZ21 | 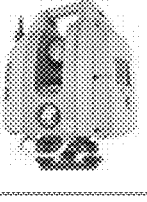 | Tripod SC |  |
| S07 | XZ01 | 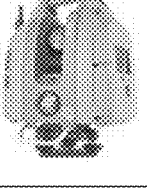 | Tripod SC | 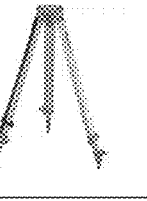 |
FIG. 8

| Type | Model number | Instrument image | Accessory | Accessory image | Precaution |
|---|---|---|---|---|---|
| TS01 | XYX1 |  | Tripod TS1 | 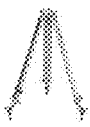 | Measure in state with less fog (visibility: approximately 20 km), an appropriate amount of sunshine, and no heat haze. |
| TS04 | YYX3 | 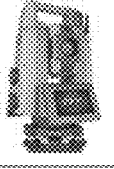 | Tripod TS3 |  | Measure in state with no obstacles, no radio disturbance in the vicinity, and no influences from noise |
| S07 | XZ01 | 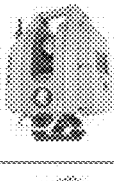 | Tripod SC |  | Measure in state with less fog (visibility: approximately 40 km), cloudy, and with no heat haze. |
| S07 | XZ21 | 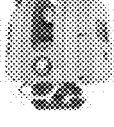 | Tripod SC |  | Measure in state with no obstacles, no radio disturbance in the vicinity, and no influences from noise |

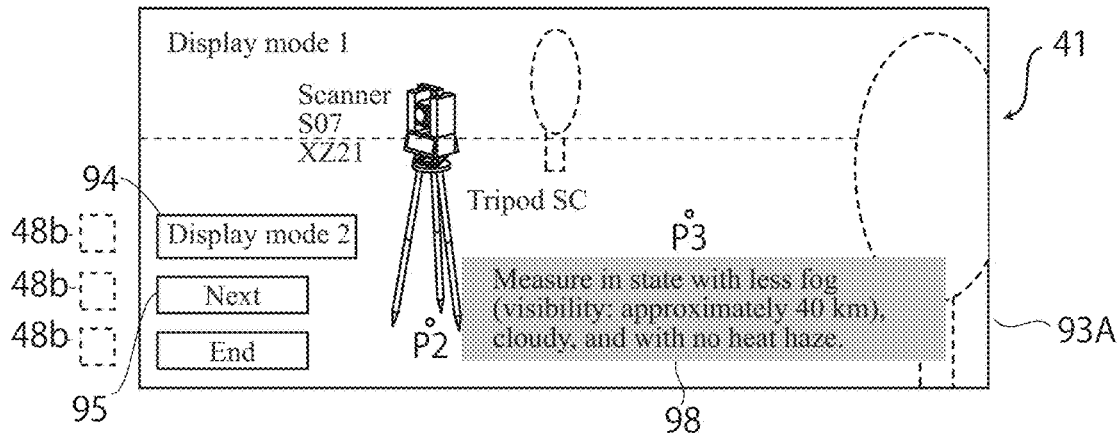

FIG. 13

| Surveying instrument: Total station TS01 | | | 92B |
|---|---|---|---|
| Process | | Detailed process | Image |
| Installation of surveying instrument | | | |
| | 1 | Installation of tripod | Image describing installation of tripod |
| | 2 | Installation of total station | Image describing installation of total station |
| | 3 | Leveling | Image describing leveling |
| | 4 | Measurement of instrument height and collimation height | Image describing measurement of instrument height and collimation height |
| | 5 | Adjustment of telescope | Image describing adjustment of telescope |
| | 6 | Turning ON of power supply | Image describing turning ON of power supply |
| | 7 | Reset of horizontal and vertical directions | Image describing reset of horizontal and vertical directions |
| Measurement | 8 | Setting of coordinates | Image describing setting of coordinates |

FIG. 14

SURVEY ASSISTANCE SYSTEM AND SURVEY ASSISTANCE METHOD

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2021-190479 filed Nov. 24, 2021. The contents of this application are incorporated herein by reference in their entirely.

TECHNICAL FIELD

The present invention relates to a survey assistance system and a survey assistance method, more specifically, to a survey assistance system and a survey assistance method using an eyewear display device.

BACKGROUND ART

Conventionally, before performing a surveying work, a process chart and a drawing describing positions of instrument installation points, a measurement order, and surveying instruments to be used are prepared so that a desired surveying work can be performed as efficiently as possible in consideration of various circumstances including structural objects, visibility of the instrument installation points, reference points, etc., drawn on the drawing of a survey site, kinds and types, etc., of owned surveying instruments. At the survey site, the surveying work is performed while the process chart and the drawing are confirmed.

CITATION LIST

Patent Literature

Patent Literature 1: Japanese Published Unexamined Patent Application No. 2021-77127

SUMMARY OF INVENTION

Technical Problem

However, performing a surveying work while confirming a process chart and a drawing at a survey site is burdensome. In particular, attention is required for an inexperienced worker in performing a survey at the time of selection and installation of surveying instruments to be used for surveys at instrument installation points.

Meanwhile, Patent Literature 1 discloses an eyewear display system which uses an eyewear display device, and manages 3D CAD (Three-Dimensional Computer Aided Design) design data of a site created in an absolute coordinate system and information on a position and a direction of the eyewear display device in the same coordinate space (system) so that the data created in the absolute coordinate system can be superimposed and observed on a site landscape.

The present invention was made in view of these circumstances, and an object thereof is to provide a survey assistance system which reduces a burden of confirming a process chart and a drawing at a survey site by using an eyewear display system.

Solution to Problem

In order to achieve the object described above, a survey assistance system according to a first aspect of the present invention is a survey assistance system including a measuring instrument including a communication unit and configured to measure a three-dimensional coordinate of a measuring object, an eyewear display device including a display, a relative position sensor configured to detect a position of the device itself, and a relative direction sensor configured to detect a direction of the device itself, and at least one processor configured to match coordinate spaces of the eyewear display device, the measuring instrument, and an absolute coordinate system, to enable information of a position and a direction of the eyewear display device and information of a position and a direction of data created in the absolute coordinate system to be managed in a space with an origin set at a common reference point, and configured to display an image in the absolute coordinate system created by the processor on the display to enable observation of the image superimposed on a site landscape observed with the eyewear display device being worn. The processor is configured to read out survey process data including at least instrument information of at least one surveying instrument to be used, three-dimensional position information of instrument installation points in the absolute coordinate system, and a measurement order of the instrument installation points, create a work assistance image based on the survey process data, and transmit the work assistance image to the eyewear display device and display the work assistance image on the display, and the work assistance image includes the instrument installation points and images of the surveying instrument to be used showing installed states at the instrument installation points, and the eyewear display device enables observation of the work assistance image by superimposing the work assistance image on the site landscape.

A survey assistance method according to a second aspect of the present invention is a survey assistance method using a measuring instrument including a communication unit and configured to measure a three-dimensional coordinate of a measuring object, and an eyewear display device including a display, a relative position sensor configured to detect a position of the device itself, and a relative direction sensor configured to detect a direction of the device itself. The method includes matching coordinate spaces of the eyewear display device, the measuring instrument, and an absolute coordinate system, to enable information of a position and a direction of the eyewear display device and information of a position and a direction of data created in the absolute coordinate system to be managed in a space with an origin set at a common reference point; displaying an image in the absolute coordinate system on the display to enable observation of the image superimposed on a site landscape observed with the eyewear display device being worn; reading-out survey process data including at least instrument information of at least one surveying instrument to be used, three-dimensional position information of instrument installation points in the absolute coordinate system, and a measurement order of the instrument installation points; creating a work assistance image based on the survey process data; and transmitting the work assistance image to the eyewear display device and displaying the work assistance image on the display, wherein the work assistance image includes the instrument installation points and images of the surveying instrument to be used showing installed states at the instrument installation points, and the eyewear display device enables observation of the work assistance image by superimposing the work assistance image on the site landscape.

Benefits of Invention

According to the aspects described above, a survey assistance system and a survey assistance method which reduce a burden of confirming a process chart and a drawing at a survey site can be provided.

BRIEF DESCRIPTION OF DRAWINGS

FIGS. 7A and 7B are diagrams illustrating an example of survey process data to be used in the same survey assistance system.

FIG. 8 is a diagram illustrating an example of work assistance data to be used in the same survey assistance system.

FIG. 12 is a diagram illustrating an example of work assistance data to be used in a modification of the same survey assistance system.

FIG. 13 is a diagram illustrating an example of a work assistance image in a survey assistance method according to the same modification.

FIG. 14 is a diagram illustrating an example of work assistance data to be used in another modification of the survey assistance system.

DESCRIPTION OF EMBODIMENTS

Hereinafter, preferred embodiments of the present invention will be described with reference to the drawings, however, the present invention is not limited to these. The same configurations common to the respective embodiments and modifications are provided with the same reference signs, and overlapping descriptions will be omitted as appropriate. The same configurations in terms of hardware are provided with the same reference signs, and overlapping descriptions will be omitted as appropriate.

I First Embodiment

1. Configuration of Survey Assistance System 100

Figure 1:
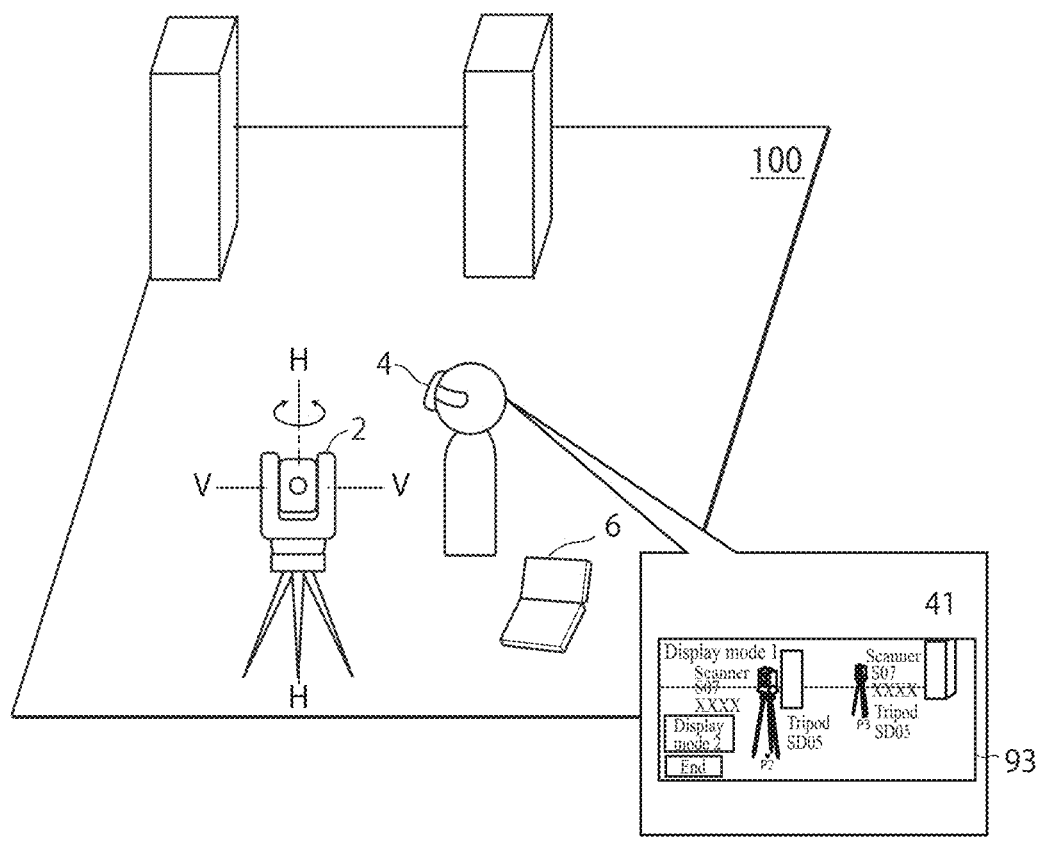
FIG. 1 is a schematic external view of a survey assistance system according to a first embodiment of the present invention.
Figure 2:
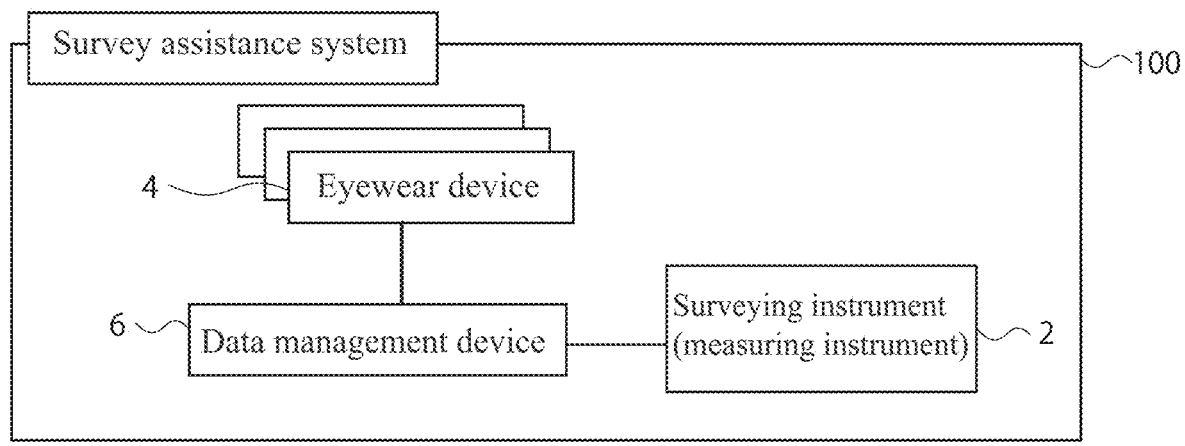
FIG. 2 is a configuration block diagram of the same survey assistance system.

FIG. 1 is an external schematic view of a survey assistance system (hereinafter, simply referred to as "system") 100 according to an embodiment of the present invention. The system 100 includes a surveying instrument 2, an eyewear display device (hereinafter, referred to as "eyewear device") 4, and a data management device 6. FIG. 2 is a configuration block diagram of the system 100.

2. Surveying Instrument 2 (Measuring Instrument)

Figure 3:
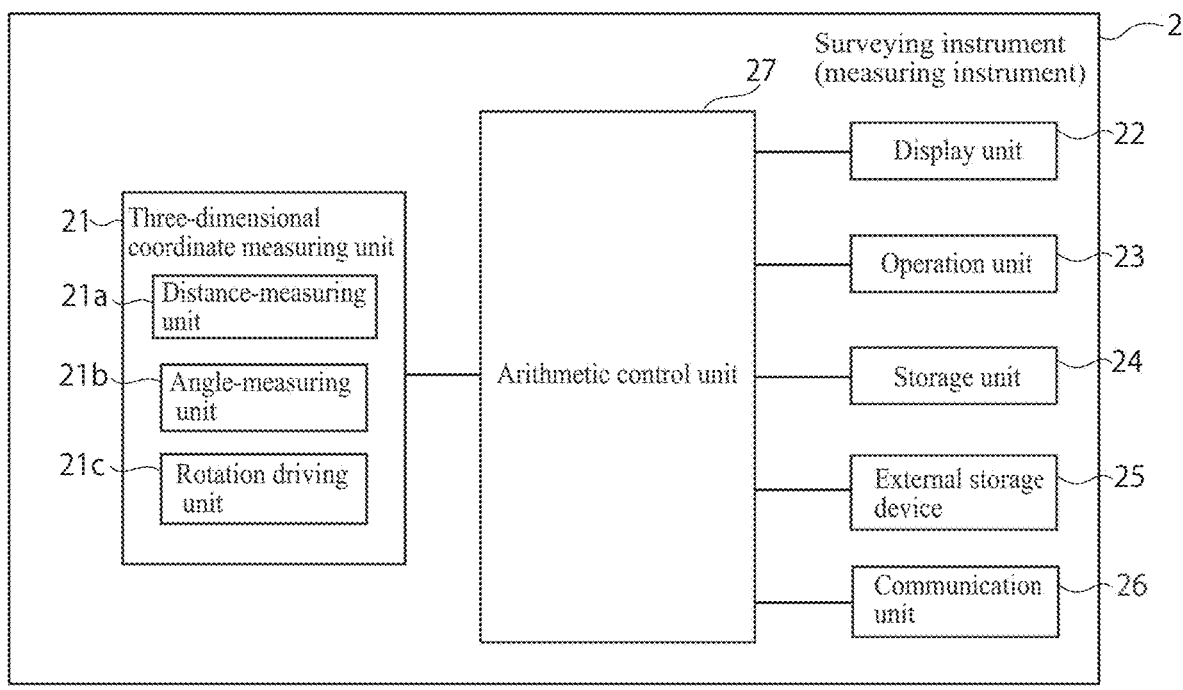
FIG. 3 is a configuration block diagram of a surveying instrument (measuring instrument) constituting the same survey assistance system.

FIG. 3 is a configuration block diagram of the surveying instrument 2 according to the present embodiment. The surveying instrument 2 includes a three-dimensional coordinate measuring unit 21, a display unit 22, an operation unit 23, a storage unit 24, an external storage device 25, a communication unit 26, and an arithmetic processing unit 27. In the illustrated example, the surveying instrument 2 is a motor-driven total station to be installed at a survey site via a tripod.

The three-dimensional coordinate measuring unit 21 includes a distance-measuring unit 21a, an angle-measuring unit 21b, and a rotation driving unit 21c. The distance-measuring unit 21a is an electro-optical distance meter that emits distance-measuring light and receives reflected light of the distance-measuring light, and obtains a distance to a measuring object by the arithmetic processing unit 27 based on received light signals of the reflected distance-measuring light and internal reference light obtained by partially splitting the emitted distance-measuring light.

The distance-measuring unit 21a is provided in a telescope that is rotated around two axes that are vertical and horizontal axes (V-V axis and H-H axis in FIG. 1) by the rotation driving unit 21c. The distance-measuring unit 21a measures angles of the measuring object by detecting a collimation direction of the telescope by the angle-measuring unit 21b that is a rotary encoder.

The display unit 22 is, for example, a liquid crystal display. The operation unit 23 includes a power key, numeric keys, a decimal key, a plus/minus key, an execution key, and a scroll key, etc., and enables a worker to operate the surveying instrument 2 and input information into the surveying instrument 2.

The storage unit 24 is, for example, a hard-disc drive (HDD), and stores programs for executing functions of the arithmetic processing unit 27.

The external storage device 25 is, for example, a memory card, etc., and stores various data acquired by the surveying instrument 2.

The communication unit 26 is a communication control device such as a network adapter, a network interface card, a LAN card, or a Bluetooth (registered trademark) adapter, and connects the surveying instrument 2 to the eyewear device 4 and the data management device 6 by wire or wirelessly. The arithmetic processing unit 27 transmits and receives information to and from the eyewear device 4 and the data management device 6 through the communication unit 26.

The arithmetic processing unit 27 is a control arithmetic unit including at least one processor (for example, CPU (Central Processing Unit)), and at least one memory (for example, SRAM (Static Random Access Memory)), DRAM (Dynamic Random Access Memory), etc. The processor reads out necessary data and program from the storage unit 24 into the memory and executes processing for realizing functions of the surveying instrument 2. The arithmetic processing unit 27 measures a distance and angles to the measuring object by controlling the three-dimensional coordinate measuring unit 21, and calculates three-dimensional position coordinates of the measuring object.

The surveying instrument 2 corresponds to the measuring instrument in claims accompanying the present description. The measuring instrument is not limited to the illustrated total station, and only has to be a surveying instrument including the communication unit 26 and a three-dimensional coordinate measuring unit capable of acquiring three-dimensional position coordinates of a measuring object. For example, the surveying instrument may be a laser scanner further including a turning mirror that causes distance-measuring light to scan 360° in the vertical direction in a vertical rotation driving unit of the three-dimensional coordinate measuring unit 21, or, for example, a camera that includes two cameras and can acquire three-dimensional position coordinates of a measuring object by photo survey as illustrated in Patent Literature 1.

3. Eyewear Device 4

Figure 4:
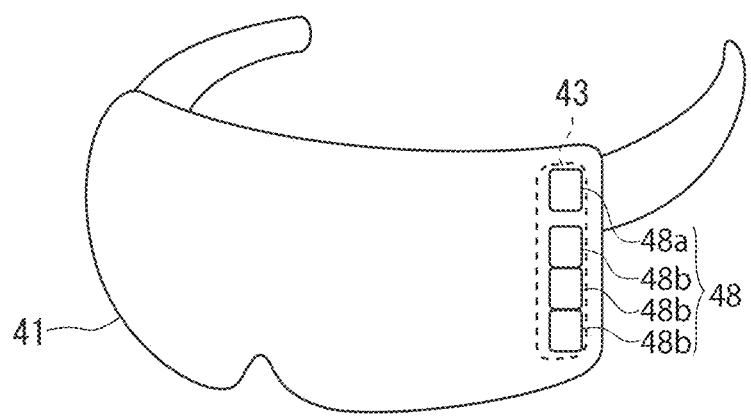
FIG. 4 is an external perspective view of an eyewear display device constituting the same survey assistance system.
Figure 5:
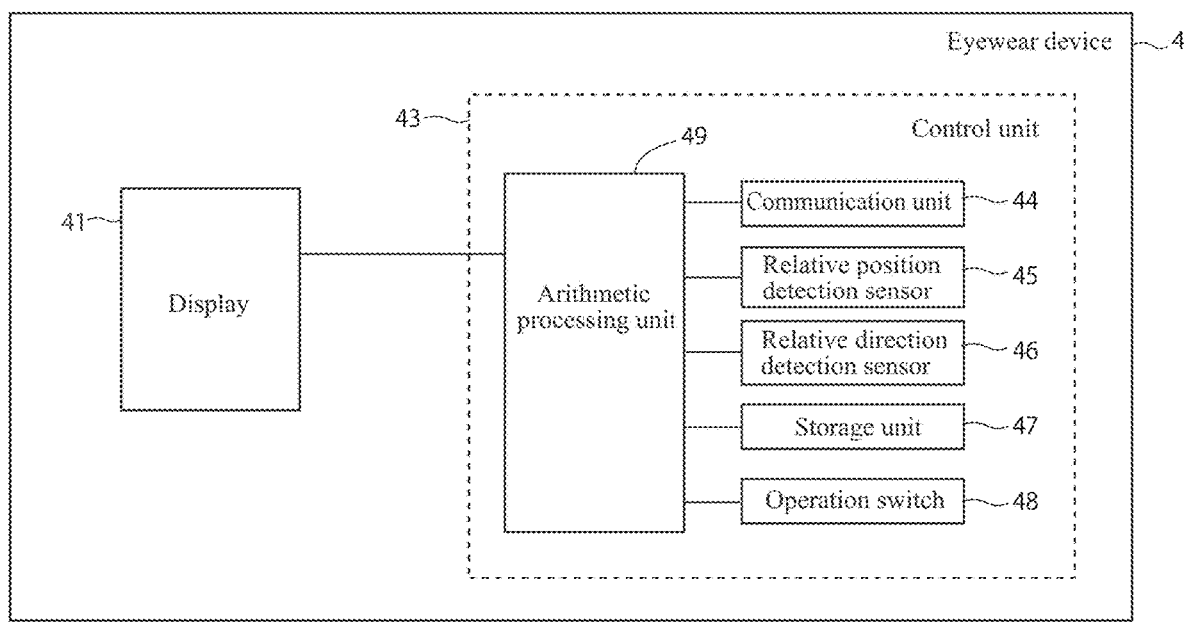
FIG. 5 is a configuration block diagram of the same eyewear display device.

FIG. 4 is an external perspective view of the eyewear device 4, and FIG. 5 is a configuration block diagram of the eyewear device 4. The eyewear device 4 is a wearable device to be worn on the head of a worker. The eyewear device 4 includes a display 41 and a control unit 43. The control unit 43 includes a communication unit 44, a relative position detection sensor 45, a relative direction detection sensor 46, a storage unit 47, an operation switch 48, and an arithmetic processing unit 49.

The display 41 is a goggles-lens-shaped transmissive display that covers the eyes of a worker when the worker wears the eyewear device. As an example, the display 41 is an optical see-through display using a half mirror, and displays an image received by the control unit 43 by superimposing the image on a site landscape. Alternatively, the display 41 may be a video see-through display, and display an image received by the control unit 43 by superimposing the image on a front landscape image acquired in real time by a camera (not illustrated). As a projection method, a virtual image projection method may be used, or a retina projection method may also be used. In this way, a worker can observe a work assistance image created by survey process data 91 and work assistance data 92, superimposed on a site landscape. The survey process data 91 and the work assistance data 92 will be described later.

When the display 41 is a video see-through display, its camera includes an image sensor, for example, a CCD (Charge Coupled Device), a CMOS (Complementary Metal Oxide Semiconductor), etc., and takes a front landscape image of the eyewear device 4 in real time. The image sensor has an orthogonal coordinate system with an origin set at a camera center, and local coordinates of each pixel are identified. A positional relationship between the camera center and a center of the eyewear device 4 is known, and the eyewear device 4 can convert a coordinate space of an image acquired by the camera into a coordinate space of the eyewear device 4 and manage the image.

The communication unit 44 is a communication control device similar to the communication unit 26. The eyewear device 4 is connected wirelessly to the Internet and a communication network such as a mobile telephone network. The arithmetic processing unit 49 can transmit and receive information to and from the surveying instrument 2 and the data management device 6 through the communication unit 44 and the communication network.

The relative position sensor 45 detects a position (own position) of the eyewear device 4 in an observation site by performing radio determination from an antenna for a GNSS (Global Navigation Satellite System), a Wi-Fi (registered trademark) access point, and an ultrasonic oscillator, etc., installed at the observation site.

The relative direction sensor 46 consists of a combination of a triaxial accelerometer or gyro sensor and a tilt sensor. The relative direction sensor 46 detects a tilt (own direction) of the eyewear device 4 by defining the up-down direction as a Z-axis direction, the left-right direction as a Y-axis direction, and the front-rear direction as an X-axis direction.

The storage unit 47 is, for example, a memory card. The storage unit 47 stores programs for the arithmetic processing unit 49 to execute functions.

The operation switch 48 is, for example, as illustrated in FIG. 4, push buttons provided on an outer surface of the display 41. The operation switch 48 includes, for example, a power button 48a for turning ON/OFF a power supply of the eyewear device 4, and function buttons 48b that enable a worker to input selections and instructions, etc., in collaboration with display on the display 41. In the present embodiment, as described later, by pressing a function button 48b at a position corresponding to a display button displayed on the display 41, a worker is enabled to input a selection, confirmation, instruction, etc.

The arithmetic processing unit 49 is a control arithmetic unit configured by, for example, mounting at least one processor (CPU) and at least one memory (SRAM, DRAM, etc.) on an integrated circuit. The arithmetic processing unit 49 outputs information on a position and a direction of the eyewear device 4 detected by the relative position sensor 45 and the relative direction sensor 46 to the data management device 6. In addition, the arithmetic processing unit 49 synchronizes a coordinate system of assistance display data received from the data management device 6 with the eyewear device 4 and displays the data on the display 41.

4. Data Management Device 6

Figure 6:
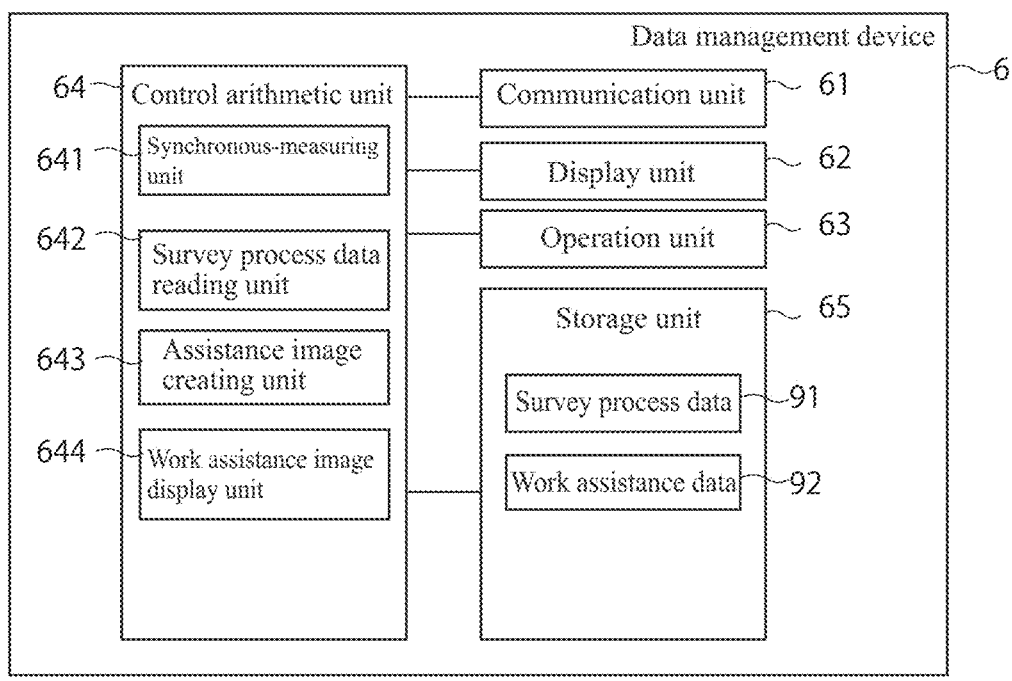
FIG. 6 is a configuration block diagram of a data management device constituting the above survey assistance system.

FIG. 6 is a configuration block diagram of the data management device 6 according to the present embodiment. The data management device 6 is an information processing device, and is typically a personal computer, a server computer, etc., or may be a tablet terminal, a smartphone, etc. In the illustrated example, the data management device 6 is a laptop computer. The data management device 6 may be one computer or a computer system in which a plurality of computers dispersively perform processing, or may logically use a part of processing resources of one or more computers. The data management device 6 may be configured as a portion of the eyewear device 4, or may be configured as a portion of the surveying instrument 2. A part of processing of the data management device 6 may be performed by the eyewear device 4, and a part of the processing may be performed by the surveying instrument 2.

The data management device 6 includes at least a communication unit 61, a display unit 62, an operation unit 63, a control arithmetic unit 64, and a storage unit 65.

The communication unit 61 is a communication control device such as a network adapter, a network interface card, a LAN card, or a Bluetooth (registered trademark) adapter, and enables the data management device 6 to communicate with the surveying instrument 2 and the eyewear device 4 by wire or wirelessly. The control arithmetic unit 64 can transmit and receive information to and from the surveying instrument 2 and the eyewear device 4 through the communication unit 61. The data management device 6 may be installed in a local environment to make communication with the surveying instrument 2 and the eyewear device 4, and may be realized as a so-called cloud environment to make communication with the surveying instrument 2 and the eyewear device 4 through a communication means such as the Internet.

The display unit 62 is, for example, a liquid crystal display. The operation unit 63 is, for example, a keyboard, a mouse, etc., and can input various instructions, selections, and determinations, etc., by a worker.

The control arithmetic unit 64 is a control arithmetic unit including, for example, at least one processor (for example, CPU) and at least one memory (DRAM, SRAM, etc.). By reading out data and programs stored in the storage unit 65 into the memory and executing the programs by the processor, functions of the functional units can be executed. At least a part of the control arithmetic unit 64 may be mounted by using a dedicated circuit.

The control arithmetic unit 64 includes, as functional units, a synchronous-measuring unit 641, a survey process data reading unit 642, a work assistance image creating unit 643, and a work assistance image display unit 644.

The synchronous-measuring unit 641 receives information on a position and a direction of the surveying instrument 2 and information on a position and a direction of the eyewear device 4, converts a coordinate space of the surveying instrument 2 and a coordinate space of three-dimensional position information created in the absolute coordinate system so that these coordinate spaces match a coordinate space of the eyewear device 4 which has an origin set at a common reference point, and transmits the information to the eyewear device 4. Accordingly, the information acquired by the surveying instrument 2 and the three-dimensional position information created in the absolute coordinate system can be managed in the same coordinate space as the coordinate space of the eyewear device 4.

In the present description, "synchronization" means, as described above, matching coordinate spaces of information on positions and directions in devices or design data with different coordinate spaces, and managing relative positions and relative directions related to the respective devices in a common coordinate space with an origin set at a common reference point.

The survey process data reading unit 642 reads out survey process data 91 stored in the storage unit 65. FIG. 7A illustrates an example of the survey process data 91, and FIG. 7B is a diagram schematically illustrating the survey process data 91 illustrated in FIG. 7A as a plan view of a survey site for understanding.

The survey process data 91 is data corresponding to a process chart and a working drawing in the surveying work in question. The working drawing generally means a drawing necessary for performing a work at a site of construction, however, here, it means a drawing obtained by adding information necessary for performing a surveying work to a design drawing. The working drawing is created based on a design drawing of the survey site created based on three-dimensional CAD data in the absolute coordinate system. Therefore, information related to positions in the survey process data 91 included in the working drawing is position information in the absolute coordinate system.

The survey process data 91 includes at least three-dimensional position information of instrument installation points in the absolute coordinate system, type information of a surveying instrument to be used, and a measurement order of the instrument installation points. As illustrated in FIG. 7A, the type information of a surveying instrument to be used may include a type code and a model number. Here, the model number is a number assigned by a manufacturer according to functions and a version. In addition, the survey process data 91 may include type and model number information of accessory (for example, a tripod, etc.) to be used together with the surveying instrument in addition to the surveying instrument. The survey process data 91 may include a design drawing of a survey site. The survey process data may include information on a measurement point as a measuring object, and information on a measurement range of a scanner when the surveying instrument is the scanner. Information on a measurement point and information on a measurement range of a scanner are information related to positions.

Those included in the survey process data 91 can be determined as appropriate such as items expected to be displayed as a work assistance image 93 (hereinafter, also simply referred to as "work assistance image"). In the present description, the surveying instrument includes various kinds of surveying instruments to be used for surveying works. Specifically, the surveying instrument includes total stations, three-dimensional scanners, electronic levels, theodolites, and GNSS devices, etc.

In the survey process data 91, information related to positions of instrument installation points P1, P2 . . . (hereinafter, referred to as instrument installation points P unless they are distinguished), a measurement point Q1 and measurement areas A, B, C . . . includes three-dimensional position information in the absolute coordinate system. FIG. 7B illustrates information in a plan view, however, information related to positions are included as three-dimensional position information in the absolute coordinate system as described above, so that the survey process data 91 is created as three-dimensional data. The survey process data 91 is created in advance according to a plan of the survey in question.

Concerning work processes at instrument points in the survey process data 91, the work assistance image creating unit 643 creates a work assistance image reflecting three-dimensional position information of the instrument points, etc., and a surveying instrument to be used by using work assistance data 92 stored in the storage unit 65.

The work assistance data 92 is, for example, as illustrated in FIG. 8, a database arranged by linking appearance images of various surveying instruments to type information. An appearance image of a surveying instrument is taken by using at least two cameras so as to create three-dimensional data having actual dimensions through a photo survey method.

The work assistance image creating unit 643 creates a work assistance image 93 as three-dimensional data synchronized with the eyewear device 4 based on an appearance image of a surveying instrument obtained as three-dimensional data on the assumption that the surveying instrument is installed at the instrument installation point P.

The work assistance image 93 is an image reflecting three-dimensional position information of the instrument installation points, etc., and a surveying instrument to be used. Specifically, for example, when an instrument to be used at the instrument installation point P2 is a scanner S07, the work assistance image is displayed as an image to indicate a state where the scanner S07 is installed on the instrument installation point P2.

The work assistance image display unit 644 transmits the work assistance image 93 created by the work assistance image creating unit 643 to the eyewear device 4, and displays it on the display 41.

The storage unit 65 is, for example, an HDD or SSD (Solid State Drive). In the storage unit 65, the above-described survey process data 91 and work assistance data 92 are stored. In addition, in the storage unit 65, in the case where the respective functional units of the control arithmetic unit 60 are realized as software, programs for executing respective functions are stored.

5. Survey Assistance Method

Figure 9:
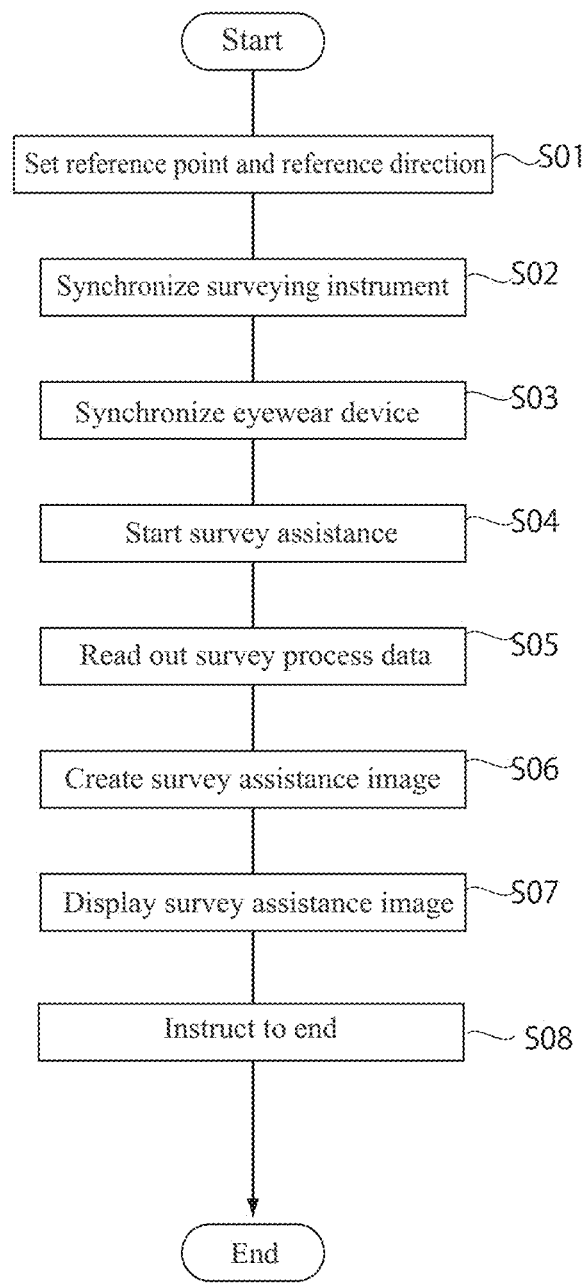
FIG. 9 is a flowchart describing processing of a survey assistance method using the same survey assistance system.
Figure 10:
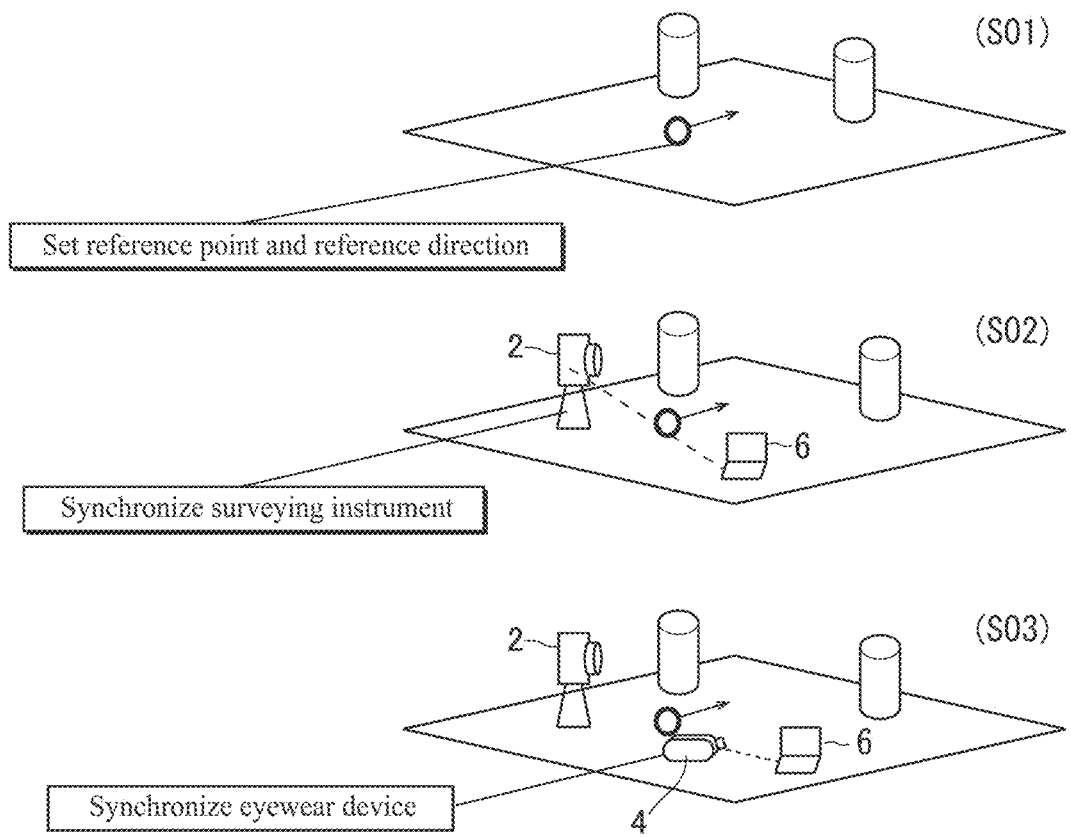
FIG. 10 is a view describing detailed steps of synchronization of position and direction information (conversion of coordinate systems) to be performed as initial settings of the same processing.

FIG. 9 is a flowchart illustrating an example of processing of the control arithmetic unit in a survey assistance method using the survey assistance system 100. In the survey assistance method using the survey assistance system 100, first, as initial settings, Steps S01 to S03 are executed. FIG. 10 is a work image view of Steps S01 to S03.

First, in Step S01, a worker sets a reference point and a reference direction at an observation site. Specifically, a known point and an arbitrary point in the site are selected, and a position of the eyewear device 4 in a state where the worker stands while wearing the eyewear device is set as the reference point. In the site, a characteristic point (for example, a corner of a structural object, etc.) different from the reference point is arbitrarily selected, and a direction from the reference point to the characteristic point is set as a reference direction.

The processing shifts to Step S02, and the worker synchronizes the surveying instrument 2. Specifically, the worker installs the surveying instrument 2 at an arbitrary point in the site, and by a known method such as backward intersection method including the reference point and the characteristic point, grasps absolute coordinates of the surveying instrument 2, and grasps absolute coordinates of the reference point and the characteristic point selected in Step S101. The surveying instrument 2 transmits the acquired absolute coordinates of the surveying instrument 2, the reference point, and the characteristic point to the data management device 6.

Next, the processing shifts to Step S03, and the worker synchronizes the eyewear device 4. Specifically, the worker installs the eyewear device 4 at the reference point, matches a center of the display 41 with the reference direction, and sets (x, y, z) of the relative position sensor 45 to (0, 0, 0) and sets (roll, pitch, yaw) of the relative direction sensor 46 to (0, 0, 0). After that, with respect to information from the eyewear device 4, the synchronous-measuring unit 641 of the data management device 6 manages a relative position and a relative direction of the eyewear device 4 in a space with an origin set at the reference point. For synchronization of the eyewear device 4, it is also preferable that the eyewear device 4 is provided with a laser device for indicating a center and a directional axis of the eyewear device 4, and the center and the directional axis are matched with the reference point and the reference direction by using a laser as a guide.

Through the work described above, the eyewear device 4 can manage image data having three-dimensional position information created in the same absolute coordinate system as the reference point in a space with an origin set at the reference point, and superimpose and display the image data on the site landscape in accordance with a position and a direction of a site landscape.

Next, in Step S04, for example, when the worker pushes the function button 48*b* corresponding to a function button displayed on the display 41 to start execution of survey assistance, in Step S05, the survey process data reading unit 642 reads out the survey process data 91 stored in the storage unit 65.

Next, in Step S06, the work assistance image creating unit 643 creates a work assistance image by using the work assistance image data.

Next, in Step S07, the work assistance image display unit 644 transmits the work assistance image created by the work assistance image creating unit 643 to the eyewear device 4, and displays the work assistance image on the display 41. The display is updated according to changes in direction and position of the eyewear device 4.

Next, in Step S08, when an instruction to end is input by the operation switch, the processing is ended.

Figure 11A:
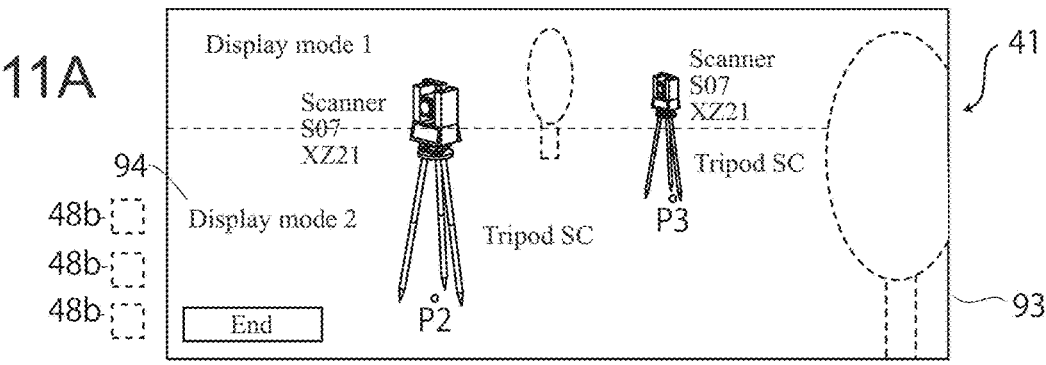
FIGS. 11A, 11B, 11C, and 11D are diagrams illustrating examples of work assistance image in the same survey assistance method.

FIGS. 11A, 11B, 11C, and 11D are diagrams illustrating examples of the work assistance image. In the figures, portions indicated by dashed lines represent a site landscape, and portions indicated by solid lines represent the work assistance image 93 created by the work assistance image creating unit 643. As illustrated in FIG. 11A, the eyewear device 4 displays, as the work assistance image 93, instrument installation points P, images of a surveying instrument installed at the instrument installation points P, and information on the surveying instrument such as a type and a model number, etc., of the surveying instrument, superimposed on the site landscape. An accessory of the surveying instrument may also be displayed in the same manner. The images of the surveying instrument have actual dimensions in the absolute coordinate system, and on the display 41, these images are enlarged or scaled down according to distances from the eyewear device 4.

In this way, in the present embodiment, as the work assistance image 93, at least the instrument installation points P and images of the surveying instrument to be used installed at the instrument installation points P are superimposed and displayed on a site landscape, so that a worker can easily recognize positions of the instrument installation points P and a surveying instrument to be installed on the instrument installation points P. In particular, the surveying instrument is displayed by using a photo image. Therefore, it can be identified according to its color and shape, etc. Accordingly, without special attention, the worker can select an instrument to be installed among instruments that the worker brought. In addition, information on the type and model number, etc., is displayed in parallel, so that the information can be confirmed as necessary.

Figure 11B:
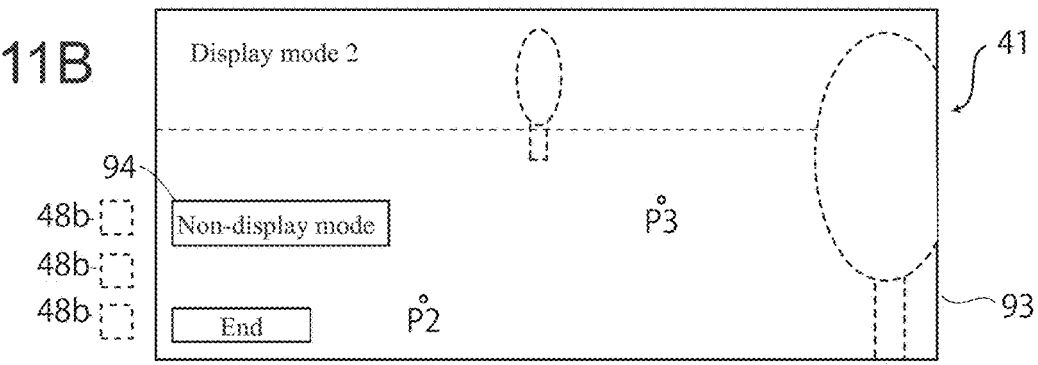
Figure 11C:
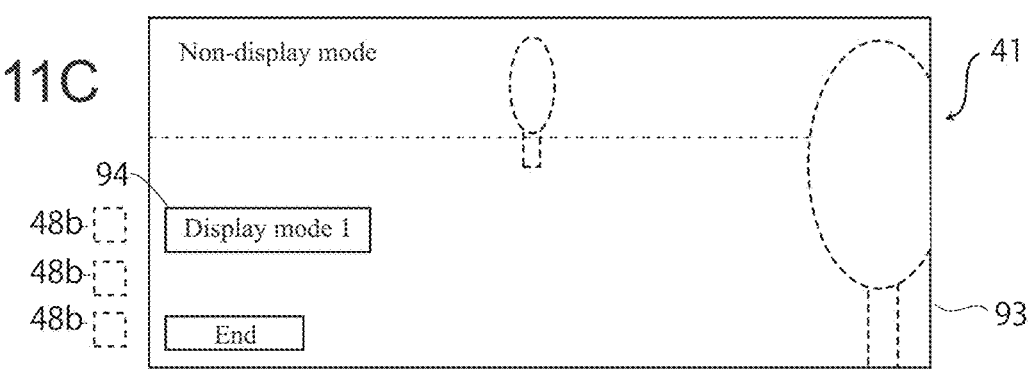

As illustrated in FIGS. 11A to 11C, the work assistance image 93 is switchable among a display mode (display mode 1: FIG. 11A) in which the whole of the work assistance image 93 is displayed, a partial display mode (display mode 2: FIG. 11B) in which only instrument points in the work assistance image 93 are displayed, and a non-display mode (non-display mode: FIG. 11C) in which the work assistance image 93 is not displayed.

In the illustrated example, by pressing the function button 48*b* corresponding to a display 94 of a mode changeover button, the mode can be switched in order.

Figure 11D:
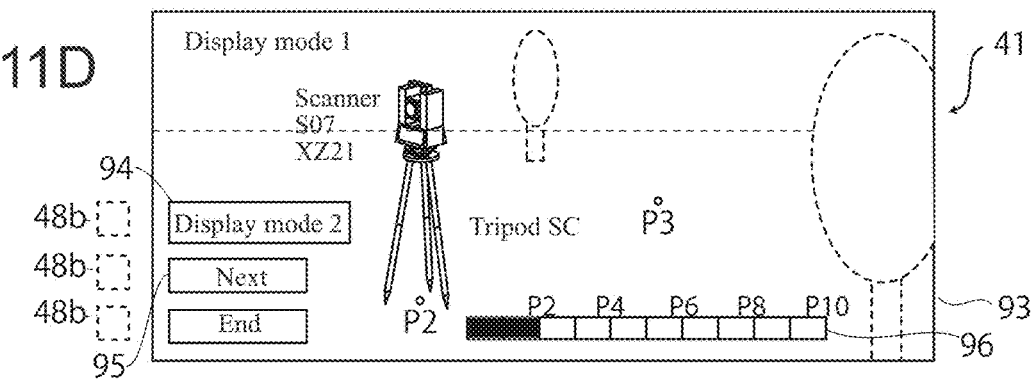

In addition, in the work assistance image 93, instead of simultaneous display of the images of the instrument at all instrument installation points, the display may be updated so that the images of the instrument at the instrument installation points P are displayed one by one in order according to the process, and then, each time a work at an instrument installation point is completed, by pressing the function button 48b corresponding to a display 95 of a "Next" button illustrated in FIG. 11D, an instrument at the next instrument installation point P is displayed. At this time, a gauge 96 indicating current progress relative to the entire process may be displayed on the display 41.

According to the configuration described above, a worker can confirm an instrument necessary for the next work without confirming the process chart again. In addition, just by following a guidance on the display, the worker can execute a work as planned in the process chart. In particular, by displaying a gauge indicating progress of the process, the worker can easily grasp the progress of the entire process.

6. Modification 1

FIG. 12 illustrates work assistance data 92A of a survey assistance system 100A according to Modification 1. Although not illustrated in the figure, the hardware configuration of the system 100A is similar to that of the system 100 illustrated in FIG. 6. In the system 100A, the storage unit 65 includes the work assistance data 92A instead of the work assistance data 92. The work assistance data 92A includes, in addition to content of the work assistance data 92, information on precautions for measurement according to the type of the instrument. Specifically, information on a precaution according to characteristics of the type is included in a manner such that, when the total station TS 01 XYX1 is a device required high measurement accuracy, information on precautions such as "Measure in state with less fog (visibility: approximately 20 km), an appropriate amount of sunshine, and no heat haze" is included. When the total station TS04 YYX3 is a device using a radio, information on precautions such as "Measure in state with no obstacles, no radio disturbance in the vicinity, and no influences from noise" is included. Information on precautions may include other various cautions for measurement.

When performing the survey assistance method, as illustrated in FIG. 13, the work assistance image creating unit displays a precaution 98 for measurement according to the type of the instrument on a work assistance image 93A in addition to the type information. For example, as illustrated in FIG. 13, the type information "S07 XZ21" and precaution information "Measure in state with less fog (visibility: approximately 40 km), cloudy, and no heat haze" are displayed. The worker confirms whether the current conditions meet the conditions prescribed in the precaution, and when the conditions are not met, takes a measure such as waiting until the start of the measurement conditions are met.

An experienced worker has acquired such precautions as rules of thumb, however, it is difficult for an inexperienced worker to memorize these for all of various kinds of surveying instruments. The above-described configuration enables even an inexperienced worker to perform a surveying work while paying attention to appropriate precautions.

7. Modification 2

FIG. 14 illustrates work assistance data 92B of a survey assistance system 100B according to Modification 2. A hardware configuration of the system 100B is similar to that of the system 100, however, the work assistance data 92B includes, for each detailed process at each instrument installation point, an image of a surveying instrument describing work content of the process. As in the work assistance data 92 in the system 100, an image of a surveying instrument describing work content is created as three-dimensional data. The image describing work content may be a still image or a moving image.

A work assistance image creating unit 643B (not illustrated) creates, as an image of a surveying instrument describing work content, three-dimensional data not of an image showing a state where the surveying instrument is installed at the instrument installation point P, but of an image describing work content in a state where the surveying instrument is installed at a position offset a predetermined distance from the instrument installation point P.

Figure 15:
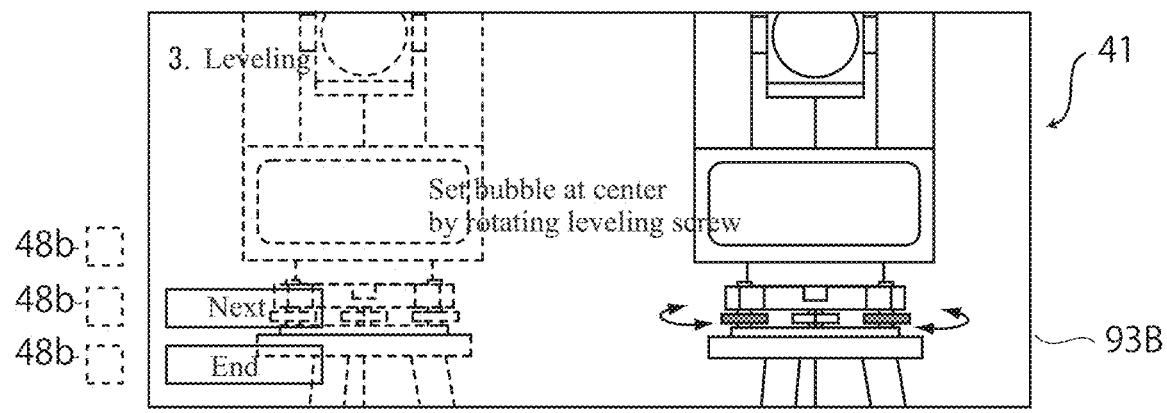
FIG. 15 is a view illustrating an example of a work assistance image in a work assistance method according to the same modification.

FIG. 15 illustrates an example of the work assistance image 93B created based on the work assistance data 92B. As the work assistance image 93B, an image describing work content (here, describing a work to set a bubble of a bubble tube at a center by rotating a leveling screw for leveling) is displayed next to an actual surveying instrument in the same visual field.

According to the configuration described above, a worker can perform a work while viewing the work assistance image 93B displayed next to an actual surveying instrument. In the same visual field range, the worker can confirm an image describing work content with his/her hands free, so that even an inexperienced worker can perform the work without stress.

The work assistance data 92B and the work assistance image creating unit 643B (not illustrated), and the work assistance data 92 and the work assistance image creating unit 643, are not alternatives, but both of these may be provided.

II. Second Embodiment

1. Observation Route Calculation Method

Before describing a survey assistance system 200 according to a second embodiment, positions and a measurement order of instrument installation points included in the survey process data 91 will be described. In the first embodiment, the description is simply given that positions and a measurement order of instrument installation points are planned in advance.

In the case of point cloud observation using a scanner, positions and a measurement order of the instrument installation points need to be set so that measurement ranges from the respective instrument installation points overlap each other to achieve a desired point cloud density. For convenience, a route unicursally connecting such instrument installation points in order of measurement is referred to as an observation route 97.

It is considered that such an observation route can be calculated by an information processing device such as a personal computer based on instrument information of the scanner (coordinates of instrument center, pulse interval setting, and scanning rotation speed setting) and three-dimensional CAD design data of a survey site.

Figure 16:
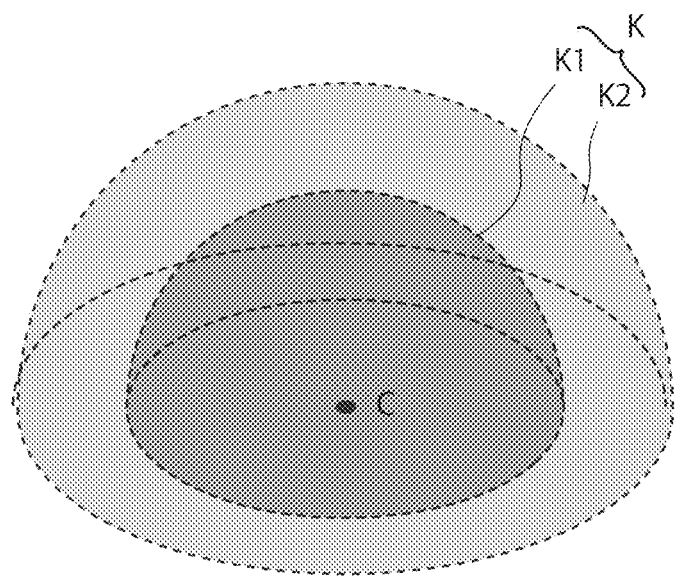
FIG. 16 is a view illustrating an image of point cloud data that a general laser scanner can acquire.
Figure 17A:
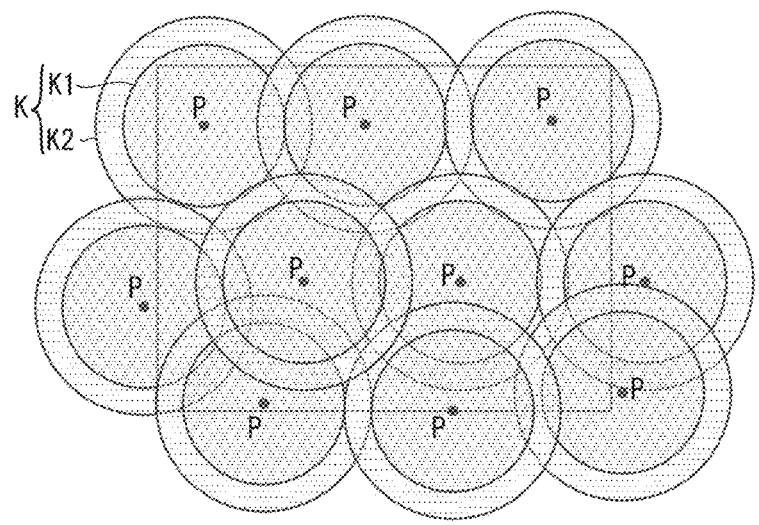
FIGS. 17A, 17B, and 17C are diagrams illustrating a method for calculating an observation route in survey process data to be used in a survey assistance system according to a second embodiment of the present invention.
Figure 17B:
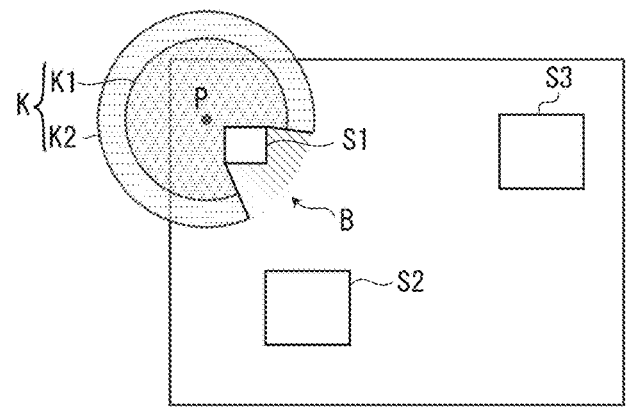
Figure 17C:
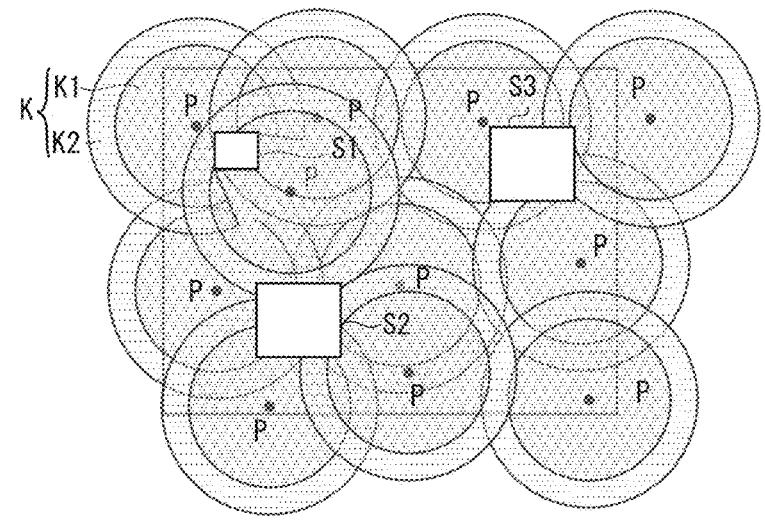
Figure 18A:
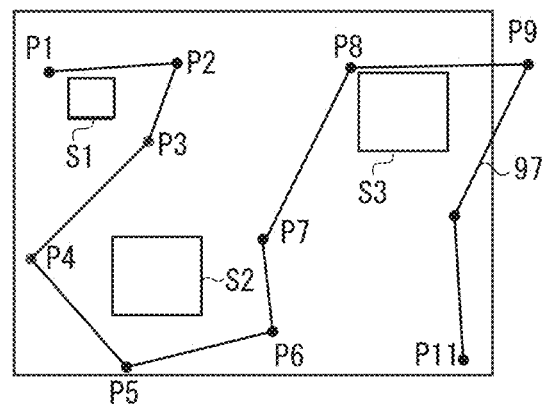
FIGS. 18A and 18B are diagrams illustrating an example of a calculated observation route.
Figure 18B:
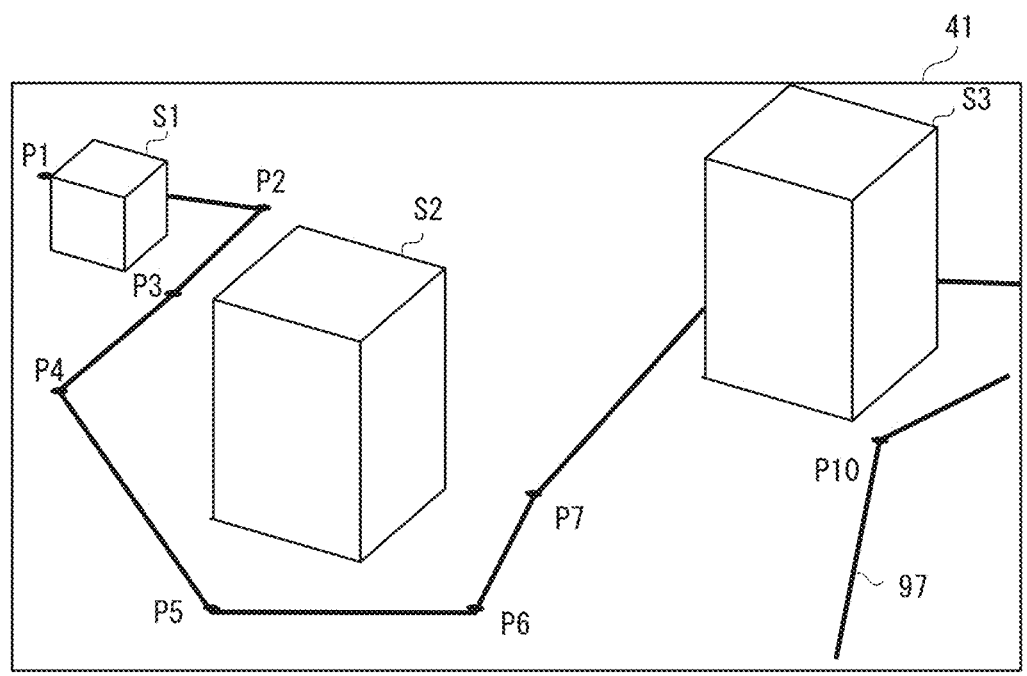

FIG. 16 is a view three-dimensionally illustrating an image of a point cloud data acquirable region K of the scanner. FIGS. 17A, 17B, and 17C are plan views schematically illustrating instrument installation point settings for calculation of an observation route. FIG. 18A illustrates an example of a calculated observation route 97, and FIG. 18B illustrates an example of display of the observation route 97 on the display 41.

In the present embodiment, the scanner is a three-dimensional laser scanner which further includes a turning mirror that causes distance-measuring light to scan 360° in the vertical direction in the vertical rotation driving unit of the three-dimensional coordinate measuring unit 21 of the surveying instrument 2, and capable of acquiring three-dimensional point cloud data of the periphery by performing scanning with distance-measuring light in the vertical direction and the horizontal direction.

Therefore, as illustrated in FIG. 16, the point cloud data acquirable region K is a substantially semispherical region A centered at an instrument center C of the scanner. For convenience of drawing, the instrument center C is illustrated as being on the ground, however, in actuality, the instrument center C is positioned higher by an instrument height of the scanner than the ground.

A density of points to be acquired by the scanner becomes higher as the pulse interval of the distance-measuring light becomes narrower, and becomes lower as the scanner rotation speed becomes higher, and becomes lower with increasing distance from the instrument center of the scanner. In this way, the point cloud density depends on pulse interval setting of the distance-measuring light of the scanner, rotation speed setting of the scanner, and the distance from the instrument center of the scanner.

In point cloud data observation, a required point cloud density is set according to the purpose of observation and a request from a client. A scanner observation range includes a region K1 in which the required point cloud density can be satisfied by one measurement, and a region K2 in which the required point cloud density cannot be satisfied by one measurement, but can be satisfied by overlapping with measurement from other points. Therefore, to design the observation route 97, for example, as illustrated in FIG. 17A, the instrument installation points P need to be set so as to satisfy the required point cloud density in the entire observation site.

However, the point cloud data observation is a survey for acquiring three-dimensional data of three-dimensional structural objects at an observation site, so that at an observation site, three-dimensional structural objects (for example, three-dimensional structural objects S1, S2, and S3 in FIGS. 17A, 17B, and 17C) are present. When three-dimensional structural objects are present, for example, as illustrated in FIG. 17B, when the three-dimensional structural object S1 is irradiated with (reflects) distance-measuring light from the scanner installed at the instrument installation point P, the distance-measuring light does not reach a portion B at an opposite side of the scanner with respect to the three-dimensional structural object, and point cloud data cannot be acquired. The same occurs three-dimensionally.

Therefore, by performing a computer simulation in consideration of the pulse interval setting of the distance-measuring light of the scanner, the rotation speed setting of the scanner, the distance from the instrument center of the scanner, and positional relationships with the three-dimensional structural objects by using the three-dimensional CAD design data of the survey site, as illustrated in FIG. 17C, positions of least instrument installation points that can cover the entire observation range at the required point cloud density are calculated. That is, point cloud data acquirable regions are calculated by excluding portions B at opposite sides of the scanner with respect to three-dimensional structural objects from the point cloud data acquirable regions K of the scanner, and by overlapping these calculated point cloud data acquirable regions, positions of least instrument installation points P that cover the entire observation site are obtained while the required point cloud density is achieved.

Further, a shortest route unicursally connecting the calculated instrument installation points P is calculated as illustrated in FIG. 18A. Accordingly, a shortest observation route 97 connecting the instrument installation points arranged so as to cover the entire observation site at the required point cloud density is calculated.

2. Survey Assistance System 200

Figure 19:
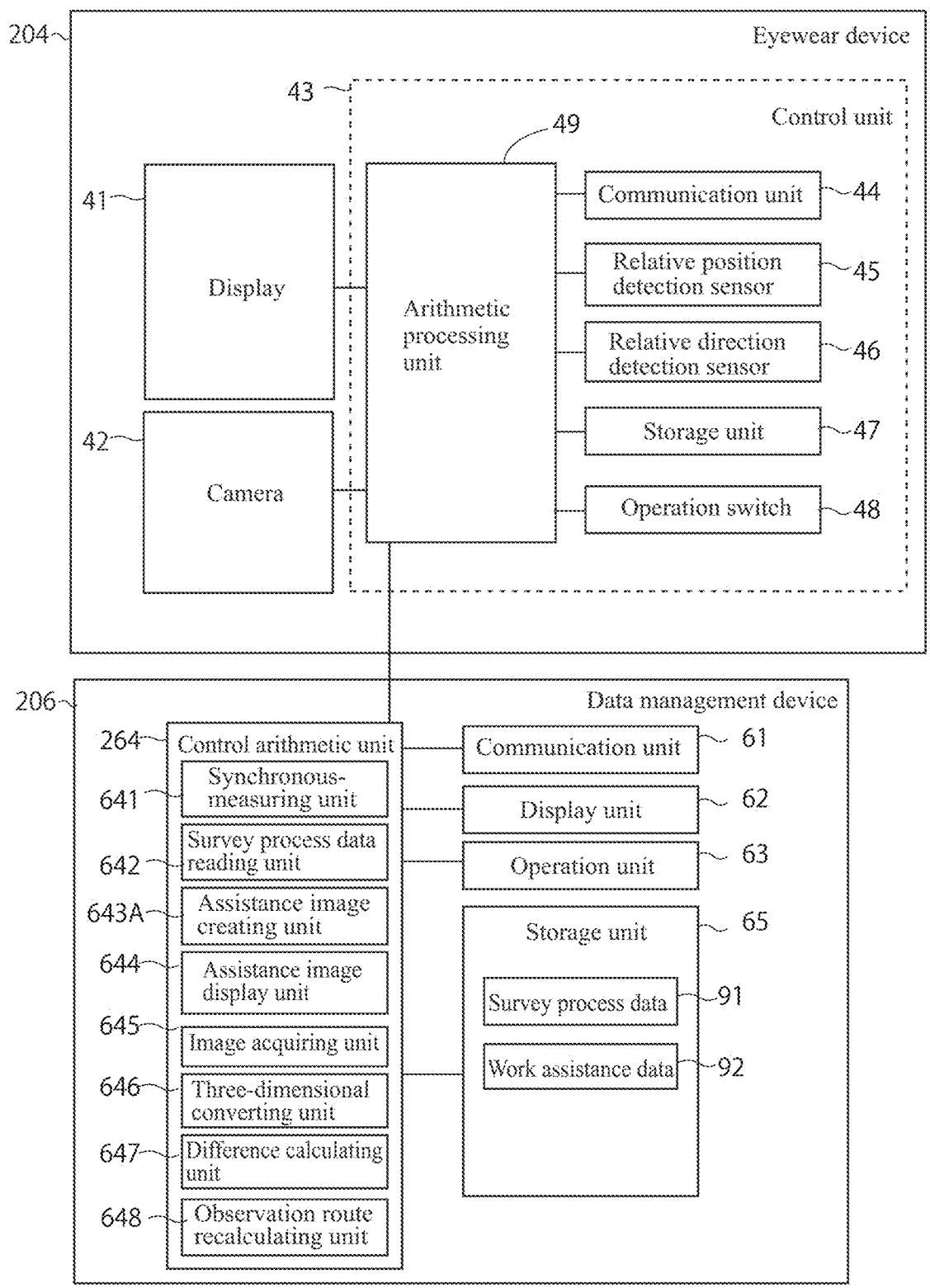
FIG. 19 is a configuration block diagram of an eyewear device and a data processing device of the survey assistance system according to the second embodiment.

The survey assistance system 200 includes an eyewear device 204 and a data management device 206 instead of the eyewear device 4 and the data management device 6 of the system 100. FIG. 19 is a configuration block diagram of the eyewear device 204 and the data management device 206 constituting the system 200.

3. Eyewear Device 204

The eyewear device 204 includes a camera 42 in addition to the eyewear device 4.

The camera 42 includes an image sensor, for example, a CCD, CMOS, etc., and takes a front landscape image of the eyewear device 4 in real time. The image sensor has an orthogonal coordinate system with an origin set at a camera center, and local coordinates of each pixel are identified. A positional relationship between the camera center and a center of the eyewear device 4 is known, and the eyewear device 4 can convert a coordinate space of an image acquired by the camera 42 into a coordinate space of the eyewear device 4 and manage the image. When the display 41 is a video see-through type and the eyewear device 4 includes a camera, the camera may be provided as a common camera.

4. Data Management Device 206

The data management device 206 includes, in addition to the data management device 6, in a control arithmetic unit 264, an image acquiring unit 645, a three-dimensional converting unit 646, a difference calculating unit 647, and an observation route recalculating unit 648, and includes a work assistance image creating unit 643A instead of the work assistance image creating unit 643.

The image acquiring unit 645 acquires a plurality of landscape images of the site taken by the camera 42. The landscape images are acquired so that at least the entire survey site is imaged from two or more different points in the survey site.

The three-dimensional converting unit 646 converts the plurality of landscape images acquired by the image acquiring unit 645 into three-dimensional data in the absolute coordinate system by using a photo survey method. Three-dimensional data of the survey site obtained from the acquired images is referred to as site three-dimensional data.

The difference calculating unit 647 calculates a difference between the site three-dimensional data and CAD design data included in the survey process data 91.

The observation route recalculating unit 648 recalculates the observation route 97 when there is a difference between the site three-dimensional data and the CAD design data (when a difference between them is more than a predetermined threshold).

A recalculated route reflecting unit 649 creates work assistance data 692 by reflecting the recalculated observation route 97 (instrument installation points and a measurement order) in the work assistance data 92.

The work assistance image creating unit 643A creates a work assistance image based on the work assistance data 692 in which the recalculation is reflected.

Figure 20:
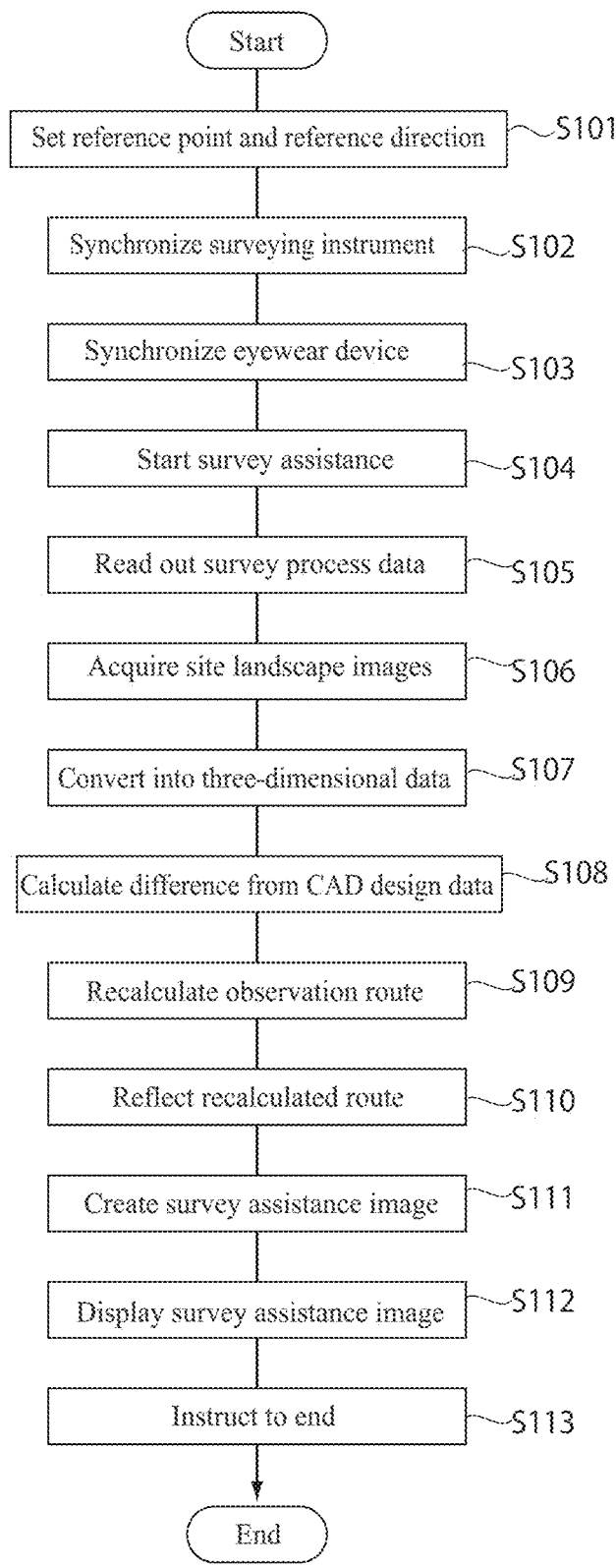
FIG. 20 is a flowchart describing processing of a survey assistance method using the same survey assistance system.

FIG. 20 is a flowchart of processing of the control arithmetic unit 60 in a survey assistance method using the survey assistance system 200.

In Steps S101 to S103, as in Steps S01 to S03, the surveying instrument 2 and the eyewear device 204 are synchronized.

When survey assistance starts in Step S104, the survey process data reading unit 642 reads out the survey process data 91 in Step S105.

In Step S106, a worker takes photos of the entire landscape of the survey site from at least two or more points by using the camera 42. The image acquiring unit 645 acquires a plurality of landscape images.

Next, in Step S107, the three-dimensional converting unit 646 converts the plurality of landscape images acquired by the image acquiring unit 645 into site three-dimensional data in the absolute coordinate system by a photo survey method.

Next, in Step S108, the difference calculating unit 647 calculates a difference between the site three-dimensional data and CAD design data included in the survey process data 91.

Next, in Step S109, the observation route recalculating unit 648 recalculates the observation route 97 when there is a difference between the site three-dimensional data and the CAD design data (when a difference between them is more than a predetermined threshold).

Next, in Step S110, the recalculated route reflecting unit 649 creates the work assistance data 692 by reflecting the recalculated observation route 97 (instrument installation points and a measurement order) in the work assistance data 92.

Subsequently, in Step S111, the work assistance image creating unit 643A creates a work assistance image based on the work assistance data 692 in which the recalculation is reflected. The subsequent processing is the same as Steps S07 and S08.

According to the configuration described above, even when there is a difference between a working drawing based on a CAD design drawing and CAD design data, and an actual site, after reflecting the difference in the survey process data 91, the survey assistance method can be performed, so that a plan change at the site can be quickly reflected.

Preferred embodiments of the present invention have been described above, and the embodiments described above are just examples of the present invention, and can be combined based on the knowledge of a person skilled in the art, and such a combined embodiment is also included in the scope of the present invention.

REFERENCE SIGNS LIST

2: Surveying instrument
4, 204: Eyewear display device
21: Three-dimensional coordinate measuring unit
26: Communication unit
41: Display
42: Camera
44: Communication unit
45: Relative position detection sensor
46: Relative direction detection sensor
61: Communication unit
64, 264: Control arithmetic unit
91: Survey process data
93, 93A, 93B: Work assistance image
96: Gauge
100, 100A, 100B, 200: Survey assistance system
641: Synchronous-measuring unit
642: Survey process data reading unit
643, 643A, 643B: Work assistance image creating unit
644: Work assistance image display unit

The invention claimed is:

1. A survey assistance system comprising:
a measuring instrument including a communication unit and configured to measure a three-dimensional coordinate of a measuring object;
an eyewear display device including a display, a relative position sensor configured to detect a position of the device itself, and a relative direction sensor configured to detect a direction of the device itself; and
at least one processor configured to match coordinate spaces of the eyewear display device, the measuring instrument, and an absolute coordinate system, to enable information of a position and a direction of the eyewear display device and information of a position and a direction of data created in the absolute coordinate system to be managed in a space with an origin set at a common reference point, and configured to display an image in the absolute coordinate system created by the processor on the display to enable observation of the image superimposed on a site landscape observed with the eyewear display device being worn,
wherein the processor is configured to read out survey process data including at least instrument information of at least one surveying instrument to be used, three-dimensional position information of instrument installation points in the absolute coordinate system, and a measurement order of the instrument installation points, create a work assistance image based on the survey process data, and transmit the work assistance image to the eyewear display device and display the work assistance image on the display, and the work assistance image includes the instrument installation points and images of the surveying instrument to be used showing installed states at the instrument installation points, and the eyewear display device enables observation of the work assistance image by superimposing the work assistance image on the site landscape,
wherein the eyewear display device further includes a camera, the processor is configured to acquire a plurality of landscape images of the entire survey site taken from at least two or more points by using the camera, convert the plurality of landscape images into site three-dimensional data as three-dimensional data of the survey site, calculate a difference between the site three-dimensional data and design data, recalculate the instrument installation points and the measurement order when there is a difference between the site three-dimensional data and the design data, reflect the recalculated instrument installation points and the measurement order in work assistance data, and
wherein the processor is configured to create the work assistance image based on the work assistance data in which the recalculation is reflected.

2. The survey assistance system according to claim 1, wherein the work assistance image is updated so that the images of the surveying instrument showing installed states at the instrument installation points are displayed in order according to the measurement order.

3. The survey assistance system according to claim 2, wherein the work assistance image shows a gauge indicating progress of a survey process.

4. The survey assistance system according to claim 2, wherein the instrument information of a surveying instrument to be used includes information on an accessory to be used together with the surveying instrument to be used.

5. The survey assistance system according to claim 2, wherein the work assistance image includes an image describing work content of the survey process, and the processor is configured to display an image describing the work content of the survey process at the instrument installation point, next to an actual surveying instrument installed at the instrument installation point.

6. The survey assistance system according to claim 1, wherein the work assistance image shows a gauge indicating progress of a survey process.

7. The survey assistance system according to claim 6, wherein the instrument information of a surveying instrument to be used includes information on an accessory to be used together with the surveying instrument to be used.

8. The survey assistance system according to claim 6, wherein the work assistance image includes an image describing work content of the survey process, and the processor is configured to display an image describing the work content of the survey process at the instrument installation point, next to an actual surveying instrument installed at the instrument installation point.

9. The survey assistance system according to claim 1, wherein the instrument information of a surveying instrument to be used includes information on an accessory to be used together with the surveying instrument to be used.

10. The survey assistance system according to claim 9, wherein the work assistance image includes an image describing work content of the survey process, and the processor is configured to display an image describing the work content of the survey process at the instrument installation point, next to an actual surveying instrument installed at the instrument installation point.

11. The survey assistance system according to claim 1, wherein the work assistance image includes an image describing work content of the survey process, and the processor is configured to display an image describing the work content of the survey process at the instrument installation point, next to an actual surveying instrument installed at the instrument installation point.

12. A survey assistance method using a measuring instrument including a communication unit and configured to measure a three-dimensional coordinate of a measuring object, and an eyewear display device including a display and a camera, a relative position sensor configured to detect a position of the device itself, a relative direction sensor configured to detect a direction of the device itself, and a processor, the method comprising:
  matching coordinate spaces of the eyewear display device, the measuring instrument, and an absolute coordinate system, to enable information of a position and a direction of the eyewear display device and information of a position and a direction of data created in the absolute coordinate system to be managed in a space with an origin set at a common reference point;
  displaying an image in the absolute coordinate system on the display to enable observation of the image superimposed on a site landscape observed with the eyewear display device being worn;
  reading-out survey process data including at least instrument information of at least one surveying instrument to be used, three-dimensional position information of instrument installation points in the absolute coordinate system, and a measurement order of the instrument installation points;
  creating a work assistance image based on the survey process data; and
  transmitting the work assistance image to the eyewear display device and displaying the work assistance image on the display,
  wherein the work assistance image includes the instrument installation points and images of the surveying instrument to be used showing installed states at the instrument installation points, and the eyewear display device enables observation of the work assistance image by superimposing the work assistance image on the site landscape, and
  using the processor to acquire a plurality of landscape images of the entire survey site taken from at least two or more points by using the camera, convert the plurality of landscape images into site three-dimensional data as three-dimensional data of the survey site, calculate a difference between the site three-dimensional data and design data, recalculate the instrument installation points and the measurement order when there is a difference between the site three-dimensional data and the design data, reflect the recalculated instrument installation points and the measurement order in work assistance data, and create the work assistance image based on the work assistance data in which the recalculation is reflected.

* * * * *